April 14, 1925.
J. A. NOLAN
FEEDER AND SCALES
Filed Oct. 3, 1924
1,533,940
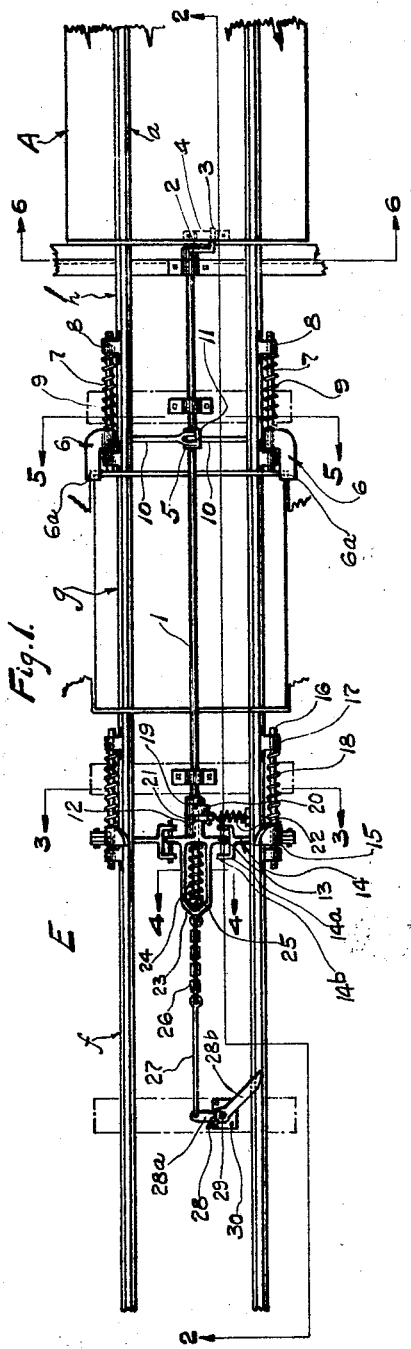
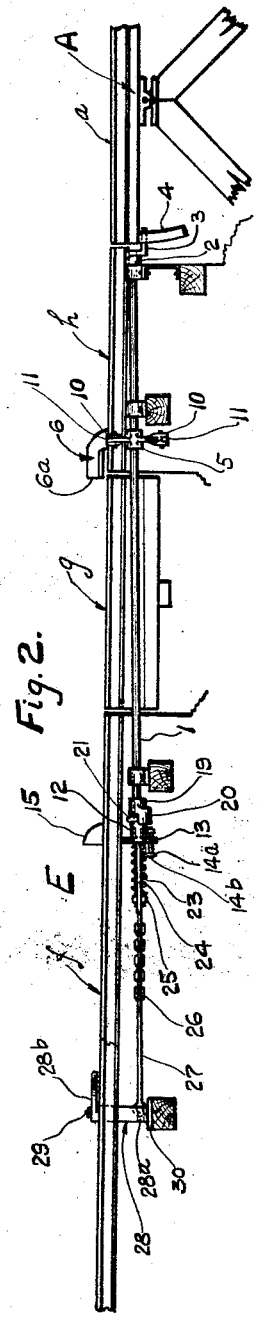
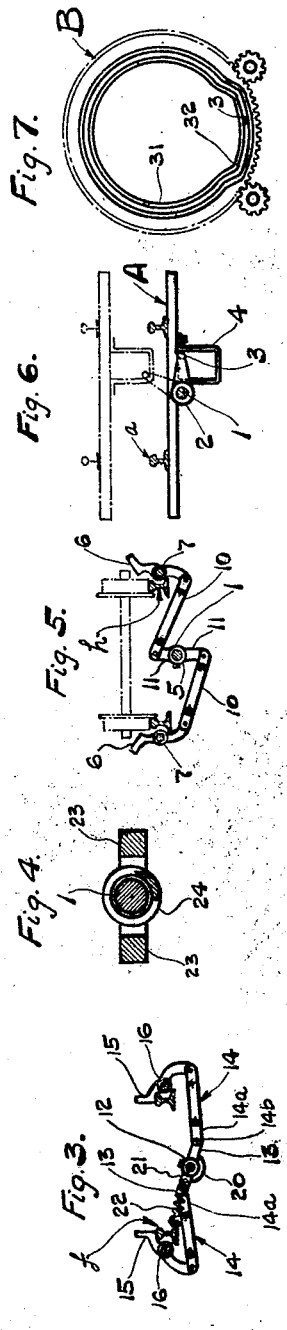
JAMES. A. NOLAN. INVENTOR
BY *Victor J. Evans*
ATTORNEY Patented Apr. 14, 1925.

1,533,940

UNITED STATES PATENT OFFICE.

JAMES A. NOLAN, OF BOWERSTON, OHIO.

FEEDER AND SCALES.

Application filed October 3, 1924. Serial No. 741,436.

*To all whom it may concern:*

Be it known that I, JAMES A. NOLAN, a citizen of the United States, residing at Bowerston, in the county of Harrison and State of Ohio, have invented new and useful Improvements in Feeders and Scales, of which the following is a specification.

This invention relates to car handling means, and more particularly to what I term feeder and scales adapted for weighing cars of coal and feeding the same to a dump, cage or similar structure.

One of the main objects of the invention is to provide a feeder of simple and efficient construction whereby cars can be cut out of a trip and fed to a position closely adjacent to the dump during the dumping operation, these cars being then fed onto the dump when it returns to loading position. A further object is to provide a feeder of this character which is of simple construction and accurate operation and will feed cars to the dump at high speed. Another object is to provide a feeder of this character in conjunction with scales, the feeder and the scales being so related that cars to be weighed will be held upon the scales by horns or stops on the track and spaced away from the scales so as to relieve the scales of all jars or racking such as occurs when the stops are located on the scale section of the track. In this respect the present invention is an improvement over the apparatus disclosed in my Patent 1,469,680 for feeding and weighing device issued October 2, 1923. Further objects will appear from the detail description.

In the drawings:—

Figure 1 is a top plan view of the apparatus;

Figure 2 is a section taken substantially on line 2—2 of Fig. 1;

Figure 3 is a section taken substantially on line 3—3 of Fig. 1;

Figure 4 is a section taken substantially on line 4—4 of Fig. 1;

Figure 5 is a section taken substantially on line 5—5 of Fig. 1;

Figure 6 is a section taken substantially on line 6—6 of Fig. 1;

Figure 7 is a diagram showing how the apparatus can be used with a rotary dump.

The apparatus is intended for use in connection with a dump or similar structure of any suitable or preferred type, the dump A illustrated in this particular instance being a tilting dump of known construction which may be provided with any suitable or preferred type of car stops which act, in a known manner, to stop the cars and hold them upon the dump during the dumping operation, the cars being released when the dump returns to loading position so that the empty car can be pushed off of the dump by an entering loaded car, which loaded car is stopped on the dump by the stops during the dumping operation. There are various types and arrangements of dump stops of this general character and it is not thought necessary to illustrate and describe the same in detail. In some instances, as where the cars are fed onto the dump without uncoupling the cars, the use of stops on the dump may not be necessary. The dump A is provided with rail sections $a$ which are aligned when the dump is in loading position with the rail sections of an approach track E which is inclined downwardly toward the dump, and with a receiving track, (not shown), provided at the other end of the dump for reception of the empty cars. This construction and arrangement of the dump and the approach and receiving tracks is well known in this art and need not be further described in detail.

The approach track E is formed of an upper trip section $f$, a central scale section $g$ which is positioned above a pit for vertical movement and is connected to scales or weighing apparatus in a known manner, and a lower or inner section $h$. A rocker shaft 1 is rockably mounted centrally of track E in suitable bearings secured to the ties of the track, this shaft being held against endwise movement and being free to turn in either direction in its bearings. Shaft 1 is provided, at its inner end, with a crank arm 2 secured thereto, this arm being provided with a finger 3 which projects through a U-shaped bracket 4 secured to the underneath of dump A. When the dump is tilted into dumping position bracket 4 contacts with finger 3 and turns crank 2, and consequently shaft 1, a predetermined distance in one direction, and when the dump returns to loading position, the dump strikes finger 3 so as to depress the same and turn the shaft in the opposite direction. A sleeve 5 is secured to shaft 1 and is connected to inner horns or stops 6 which are rockably mounted on supporting bars 7 mounted through bearing blocks 8 secured to the rails of the track section *h*, stops 6 being normally held in their outer or operative position by cushion springs 9 mounted about supporting bars 7 and confined between the stops and the inner bearing blocks 8. As will be noted more clearly from Fig. 1, each stop 6 is provided with an extension 6ª of such length as to project above or outwardly beyond the inner end portion of scale section *g* of the track. The stops 6 are rockably mounted intermediate their ends and have their lower ends connected by links 10 to arms 11 projecting from sleeve 5 in such a manner that the stops will be opened when the dump returns to loading position and closed when the dump turns into dumping position.

Shaft 1 extends above scale section *g* of the track but is not connected thereto so that this section has vertical movement independently of the rest of the track. A sleeve 12 is loosely mounted on shaft 1 adjacent the outer end thereof, this sleeve being mounted for turning and sliding movement on the shaft. Sleeve 12 is connected by fingers 13 and links 14 to outer trip holding stops 15 rockably mounted intermediate their ends upon bars 16 supported in bearing blocks 17 secured to the rails of track section *f*. These stops are normally held in their outer position by cushion springs 18 mounted about rods 16 and confined between the stops and the inner bearing blocks 17. A collar 19 is secured on the shaft adjacent to the inner end of sleeve 12 and is provided with an arm or cam 20 which, when the sleeve and collar are in operative relation, extends about the sleeve concentric therewith and beneath a stud 21 which projects from the sleeve and to which is secured a tension spring 22 the outer end of which is secured to the adjacent rail of section *f* of track E. This spring acts to turn sleeve 12 in stop-closing direction when the sleeve is released from arm 20.

A clevis 23 is secured to the sleeve and an expansion spring 24 is mounted about the end portion of shaft 1 within the clevis 23, this spring being confined between sleeve 12 and a collar 25 adjustably secured on the shaft by a set screw, or in any other suitable or preferred manner, to vary the compression of the spring as desired. Clevis 23 is connected by a length of chain 26 or other suitable flexible connection to one end of a link 27 the other end of which is loosely secured through arm 28ª of a trip lever 28 pivoted at 29 on a supporting plate or bracket 30 secured to the adjacent rail of track section *f*, or in any other suitable or preferred manner. Outer arm 28ᵇ of trip lever 28 extends across the adjacent rail in position to be engaged by the wheel of a car traveling on track section *f*. When the dump turns into dumping position the inner stops 6 are closed and the outer trip holding stops 15 are opened by means of the operating arm 20 of collar 19. This permits the front car of the trip to pass between stops 15 and travel onto scale section *g* of the track, on which section the car is held by the extensions 6ª of stops 6 so as to permit weighing of the car. The following car of the trip operates lever 28 so as to retract clevis 23 and arm 12 pulling the stud 21 outwardly out of engagement with arm 20. This permits spring 22 to turn sleeve 12 in stop-closing direction thus closing stops 15 and holding back the trip. During the dumping operation and after stops 15 have been closed, stud 21 contacts with the outer face of arm 20 which is disposed concentric with sleeve 12 and is of such length circumferentially of the sleeve as to prevent stud 21 from passing beneath arm 20, arm 20 being held in raised position as long as the inner stops 6 are closed. Upon return of the dump to loading position shaft 1 is turned in proper direction to open stops 6 thus permitting the car on the scale section *g* to travel by gravity onto the dump, the entering loaded car pushing the empty car off of the dump. When the shaft 1 is turned to open stops 6 upon return of the dump to loading position, collar 19 is turned with the shaft so as to bring arm 20 beneath stud 21 and sleeve 12 is returned to its normal operative position by the action of spring 24. When the dump again turns into dumping position stops 6 are closed and stops 15 are opened, in the manner previously described, and the front car of the trip is fed onto scale section *g*, the following car of the trip closing the stops 15 in the manner described. This operation is repeated continuously as long as the dump is in operation thus providing very simple and highly efficient means for automatically cutting cars out of the trip, weighing these cars and then feeding them onto the dump. As the stops 6 are closed and the trip stops are opened during the dumping operation and stops 6 are opened immediately upon return of the dump to loading position, this apparatus is capable of feeding cars to the dump much faster than apparatuses now commonly in use for this purpose, thus effecting a material saving in time which is of importance in handling cars in mining operations.

To permit sliding movement of sleeve 12 on shaft 1, each of the links 14 is provided on its inner end with an elongated U-shaped head 14ª in the arms of which is secured a heavy pin 14ᵇ which passes loosely through the outer end of finger 13. This connection permits the necessary sliding movement of sleeve 12 without in any way interfering with the proper operation of stops 15. This result can be accomplished by other means which would be obvious to one skilled in this art, though I ordinarily prefer to employ the means illustrated and described. While the apparatus is intended more particularly for use in connection with a scales or weighing means, this apparatus is also well suited for use as a feeder without the scales.

In Fig. 7 I have indicated the manner in which the apparatus can be applied to a rotary dump. The dump B is of known construction and is turned about a substantially horizontal axis in a known manner, the means for rotating dumps of this type being well known in this art. The dump is provided, at the end thereof adjacent the approach track, with a channel ring 31 having an offset or cam portion 32. This ring receives pin 3 of crank 2. When dump B returns to loading position pin 3 enters cam portion 32 so as to be depressed thereby thus turning shaft 1 in inner stop opening direction, and as the dump turns into dumping position pin 3 passes out of cam portion 32 into the main channel of the ring 31. This raises pin 3 turning shaft 1 in inner stop closing direction, and as the dump again returns to loading position pin 3 enters cam portion 32 turning shaft 1 in inner stop opening direction. This operation is repeated during operation of the dump, thus providing simple and highly efficient means whereby loaded cars are automatically cut out of the trip, weighed and then fed to the dump.

As will be obvious, and as above indicated, changes in construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In car handling means, in combination with a dump provided with car receiving means, and an approach track leading to the dump, inner stops mounted on the approach track, outer trip holding stops mounted on the track beyond said inner stops, means for closing the inner stops as the dump moves into dumping position and opening said inner stops as the dump returns to loading position, means for opening the outer trip holding stops as the inner stops are closed, and means for closing said outer stops independently of the inner stops and after a car has passed between the outer trip holding stops toward the inner stops.

2. In car handling means, in combination with a dump provided with car receiving means, and an approach track leading to the dump, inner stops and outer stops on the approach track, means for closing the inner stops and opening the outer stops as the dump moves into dumping position and for opening said inner stops as the dump returns to loading position, and means for closing said outer stops independently of the inner stops after a car has passed between the outer stops.

3. In car handling means, in combination with a dump provided with car receiving means, and an approach track leading to the dump, inner stops and outer stops on the approach track, dump actuated means for closing the inner stops and opening the outer stops as the dump moves into dumping position and for opening said inner stops as the dump returns to loading position, and car actuated means for closing said outer stops independently of the inner stops after a car has passed between the outer stops.

4. In car handling means, in combination with a dump provided with car receiving means, and an approach track leading to the dump, a rocker shaft, inner stops on the track, operating connections between said shaft for opening the stops when the shaft is turned in one direction and closing the stops when said shaft is turned in the other direction, means for turning said shaft in stop-opening direction as the dump moves into loading position and in stop-closing direction as the dump moves into dumping position, outer stops on the track beyond said inner stops, cooperating means carried by the shaft and connected to the outer stops for opening the same when said shaft is turned in inner stop-closing direction, and means for releasing the outer stops and closing them independently of the shaft when a car has passed between said outer stops.

5. In car handling means, in combination with a dump provided with car receiving means, and an approach track leading to the dump, a rocker shaft, inner stops on the track, operating connections between said shaft for opening the stops when the shaft is turned in one direction and closing the stops when said shaft is turned in the other direction, means for turning said shaft in stop-opening direction as the dump moves into loading position and in stop-closing direction as the dump moves into dumping position, outer stops on the track beyond said inner stops, cooperating means carried by the shaft and connected to the outer stops for opening the same when said shaft is turned in inner stop-closing direction, and car actuated means for releasing the outer stops and closing them independently of the shaft when a car has passed between said outer stops.

6. In car handling means, in combination with a dump provided with car receiving means, and an approach track leading to the dump, a rocker shaft, inner stops on the track, operating connections between said shaft for opening the stops when the shaft is turned in one direction and closing the stops when said shaft is turned in the other direction, means for turning said shaft in stop-opening direction as the dump moves into loading position and in stop-closing direction as the dump moves into dumping position, outer stops on the track beyond said inner stops, a sleeve mounted to turn on the shaft, connections between said sleeve and the outer stops for opening and closing the latter in accordance with turning of the sleeve, means for connecting the sleeve to the shaft and turning it in stop-opening direction when said shaft is turned in inner stop-closing direction, means urging the outer stops in closing direction, and means for releasing said sleeve from the shaft to permit closing of said outer stops after a car has passed between said outer stops.

7. In car handling means, in combination with a dump provided with car receiving means, and an approach track leading to the dump, a rocker shaft, inner stops on the track, operating connections between said shaft for opening the stops when the shaft is turned in one direction and closing the stops when the shaft is turned in the other direction, means for turning said shaft in stop-opening direction as the dump moves into loading position and in stop-closing direction as the dump moves into dumping position, outer stops on the track beyond said inner stops, a sleeve mounted to turn on the shaft, connections between said sleeve and the outer stops for opening and closing the latter in accordance with turning of the sleeve, means for connecting the sleeve to the shaft and turning it in stop-opening direction when said shaft is turned in inner stop-closing direction, means urging the outer stops in closing direction, and car actuated means for releasing said sleeve from the shaft to permit closing of said outer stops after a car has passed between said outer stops.

8. In car handling means, in combination with a dump provided with car receiving means, and an approach track leading to the dump, a rocker shaft, inner stops on the track, operating connections between said shaft for opening the stops when the shaft is turned in one direction and closing the stops when the shaft is turned in the other direction, means for turning said shaft in stop-opening direction as the dump moves into loading position and in stop-closing direction as the dump moves into dumping position, outer stops on the track beyond said inner stops, a sleeve loosely and slidably mounted on the shaft, connections between said sleeve and the outer stops for opening and closing the latter in accordance with turning of the sleeve, an operating arm secured on the shaft and extending in the direction of the sleeve, the sleeve being provided with an element extending across said arm and so related thereto as to turn said sleeve in stop-opening direction when said shaft is turned in inner stop-closing direction, means urging the sleeve in stop-closing direction, means for normally holding the sleeve in operative relation to the arm, and means for releasing said sleeve from the arm to permit closing of the outer stops when a car has passed between the same, said arm extending about the sleeve a distance greater than the distance through which said sleeve is turned in stop closing direction.

9. In car handling means, in combination with a dump provided with car receiving means, and an approach track leading to the dump, a rocker shaft, inner stops on the track, operating connections between said shaft for opening the stops when the shaft is turned in one direction and closing the stops when the shaft is turned in the other direction, means for turning said shaft in stop opening direction as the dump moves into loading position and in stop closing direction as the dump moves into dumping position, outer stops on the track beyond said inner stops, a sleeve loosely and slidably mounted on the shaft, connections between said sleeve and the outer stops for opening and closing the latter in accordance with turning of the sleeve, an operating arm secured on the shaft and extending in the direction of the sleeve, the sleeve being provided with an element extending across said arm and so related thereto as to turn said sleeve in stop opening direction when said shaft is turned in inner stop closing direction, means urging the sleeve in stop closing direction, means urging the sleeve toward said arm, a trip lever on the track beyond the trip stops and positioned to be tripped by a car traveling on the track, and connections between said lever and the sleeve for moving said sleeve out of engagement with the arm when the lever is tripped, said arm extending about the sleeve a distance greater than the distance through which said sleeve is turned in stop closing direction.

10. In car handling means, in combination with a dump provided with car receiving means, and an approach track leading to the dump, inner stops and outer stops mounted on the track, means for closing the inner stops and opening the outer stops as the dump moves into dumping position and for closing the inner stops independently of said outer stops as the dump returns to loading position, and means for closing the outer stops independently of the inner stops after a car has passed between said outer stops.

11. In car handling means, in combination with a dump provided with car receiving means, and an approach track leading to the dump, a rocker shaft on the approach track, inner stops on the track, connections between said stops and the shaft for opening and closing the stops in accordance with turning of the shaft, means for turning the shaft in stop closing direction when the dump moves into dumping position and in stop opening direction when the dump returns to loading position, outer trip holding stops on the track beyond said inner stops, means for operatively connecting the trip stops to said shaft in opposite relation to the inner stops when the shaft is turned in inner stop closing direction, and means for releasing said outer stops and closing them independently of the shaft after a car has passed between the outer stops.

12. In combination with a car receiving structure and an approach track leading thereto and including a movable scales section and inner and outer fixed sections at the ends of the movable section, stops mounted on one of the fixed sections and extending when in operative position above the scales section and in position to hold a car thereon, and means for moving said stops into and out of operative position in accordance with movement of said structure into discharging and receiving position.

13. In combination with a car receiving structure and an approach track leading thereto and including a movable scales section and other sections leading to and from said scales section, stops mounted on one of said other sections and adapted and disposed to extend inwardly of the scales section to hold a car thereon when said stops are in operative position, and means for moving said stops into and out of operative position in accordance with movement of said structure into discharging and receiving position.

14. In combination with a car receiving structure and an approach track leading thereto and including a movable scales section and other sections leading to and from said scales section, stops mounted on one of said other sections and adapted and disposed to extend inwardly of the scales section to hold a car thereon when said stops are in operative position, and means for feeding cars onto said scales section and for moving the stops into and out of operative position in accordance with movement of said structure into discharging and receiving position.

15. In combination with a car receiving structure and an approach track leading thereto and including a movable scales section and an outer section leading to said scales section and an inner section leading from the scales section to the car receiving structure, stops on the inner section positioned and adapted to extend inwardly of the scales section and to hold a car thereon when said stops are closed, and means for opening said stops when the receiving structure is in receiving position and for closing the stops and feeding cars onto said scales section when said car receiving structure moves into discharging position.

16. In car handling means, a track including a movable scales section and other sections leading to and from said movable section, means for feeding cars onto the movable section, stops detached from the scales section and positioned and adapted to hold a car thereon when said stops are closed, and means for opening and closing said stops.

17. In car handling means, a track including a movable scales section and other sections leading to and from said movable section, stops detached from the scales section and positioned and adapted to hold a car thereon when said stops are closed, and means for opening and closing said stops.

In testimony whereof I affix my signature.

JAMES A. NOLAN.